(12) United States Patent
Krueger (10) Patent No.: US 8,829,402 B2
(45) Date of Patent: Sep. 9, 2014

(54) AUTOFOCUSING DEVICE FOR MICROSCOPES AND SUITABLE AUTOFOCUS APERTURE STOPS

(75) Inventor: Ralf Krueger, Butzbach Griedel (DE)

(73) Assignee: Leica Microsystems CMS GmbH, Wetzlar (DE)

( * ) Notice: Subject to any disclaimer, the term of this patent is extended or adjusted under 35 U.S.C. 154(b) by 207 days.

(21) Appl. No.: 13/165,770

(22) Filed: Jun. 21, 2011

(65) Prior Publication Data

US 2011/0317260 A1    Dec. 29, 2011

(30) Foreign Application Priority Data

Jun. 23, 2010   (DE) .................. 10 2010 030 430

(51) Int. Cl.
*G01C 21/02* (2006.01)
*G02B 21/00* (2006.01)
*G02B 21/24* (2006.01)

(52) U.S. Cl.
CPC ..................... *G02B 21/241* (2013.01)
USPC ............ 250/201.4; 359/383; 250/201.3; 250/201.6

(58) Field of Classification Search
USPC .......... 250/201.2–201.4, 201.6; 359/381, 383
See application file for complete search history.

(56) References Cited

U.S. PATENT DOCUMENTS

| 4,517,666 | A | * | 5/1985 | Ando .................. 369/44.24 |
| 5,136,149 | A |   | 8/1992 | Fujiwara et al. |
| 5,925,874 | A | * | 7/1999 | Liegel et al. ............. 250/201.3 |
| 6,091,075 | A | * | 7/2000 | Shibata et al. ........... 250/559.44 |
| 7,345,814 | B2 |  | 3/2008 | Yoneyama et al. |
| 2003/0184856 | A1 | | 10/2003 | Otaki |
| 2004/0113043 | A1 | | 6/2004 | Ishikawa et al. |

FOREIGN PATENT DOCUMENTS

| AT | 353497 B | 11/1979 |
| DE | 2102922 A1 | 9/1972 |
| DE | 3219503 A1 | 12/1983 |
| DE | 19537376 A1 | 4/1996 |
| DE | 19725483 A1 | 1/1998 |
| DE | 10234757 A1 | 2/2004 |
| DE | 102008044509 A1 | 3/2010 |
| JP | 2004251984 A * | 9/2004 |

* cited by examiner

*Primary Examiner* — Thanh Luu (74) *Attorney, Agent, or Firm* — Patentbar International, P.C.

(57) ABSTRACT

The present invention relates to an autofocus aperture stop (5, 6) in a triangulating autofocusing device (21) for a microscope (40), wherein the autofocus aperture stop (5, 6) comprises at least one diaphragm opening (3, 4) with which a measuring beam pencil (34) used for the autofocusing and running in the direction of the optical axis (18) of the autofocusing device (21) can be limited in its cross section, wherein the diaphragm opening (3, 4) of the autofocus aperture stop (5, 6) is arranged in a decentred position at a spacing from the optical axis (18) of the autofocusing device (21), wherein a decentred autofocus measuring beam (36) can be generated by the diaphragm opening (3, 4) in one half of the cross section (17) of the measuring beam pencil (34).

17 Claims, 5 Drawing Sheets

Fig. 1

Prior Art

AUTOFOCUSING DEVICE FOR MICROSCOPES AND SUITABLE AUTOFOCUS APERTURE STOPS

CROSS-REFERENCE TO RELATED APPLICATIONS

This application claims priority to German Patent Application No. DE 10 2010 030 430.1 filed on Jun. 23, 2010, that is incorporated herein by reference in its entirety.

FIELD OF THE INVENTION

The present invention relates to an autofocus aperture stop or diaphragm in a triangulating autofocusing device for a microscope, wherein the aperture stop comprises at least one diaphragm opening and is configured so as to define the cross-section of a measuring beam pencil used for the autofocusing and running in the direction of the optical axis of the autofocusing device, as well as a triangulating autofocusing device for a microscope having an aperture stop of this kind for producing an autofocus measuring beam and autofocusing optical means, in order to generate a measuring pattern on an object by means of the autofocus measuring beam using an objective of the microscope.

By a measuring pattern is meant for example a measuring spot or a measuring slot or another suitable pattern that is typically used in a triangulating autofocusing device for detecting defocusing.

BACKGROUND OF THE INVENTION

A triangulating autofocusing device is known from U.S. Pat. No. 5,136,149 B1. DE 195 37 376 A1 discusses this US patent and refers to the autofocus principle described therein as the "triangulating" autofocus principle. A number of microscopes in the prior art have triangulating autofocusing devices or autofocusing scanner units which use an angular or oblique autofocus measuring beam and a reflecting or regular or directed reflection on the object. Therefore, as shown in the attached FIG. 1, which corresponds to the triangulating autofocus principle known from the above-mentioned U.S. Pat. No. 5,136,149 B1, an autofocusing light source 19 is arranged such that after the deflection of the measuring beam 30 and after said beam 30 has passed through the microscope objective 10 the object plane 16 is struck by the autofocus measuring beam diagonally or at a sloping angle. The autofocusing scanner unit additionally contains a position-sensitive autofocus detector 28 for detecting the lateral shift in the beam (as will be described hereinafter) and a motor 27 for moving the objective 10. Alternatively, the object plane 16 can also be shifted in the direction of the optical axis.

Figure 1:
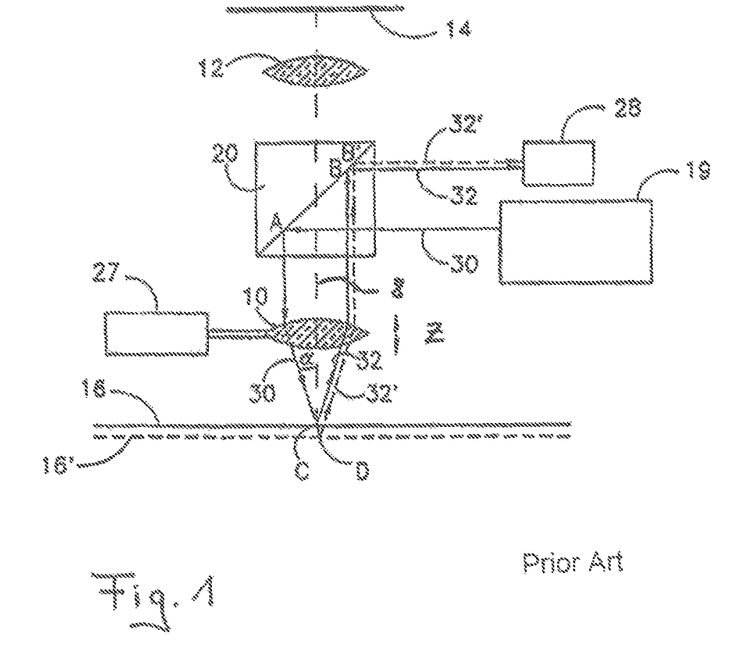
FIG. 1 shows a schematically represented example of a triangulating autofocusing device according to the prior art.

In the autofocusing device with a microscope according to FIG. 1, the measuring beam designated 30 is deflected by the beam splitter 20 at a point A into one half of the beam cross-section (in relation to the optical axis 8). The deflected beam 30 is deflected or diffracted by the objective 10 so as to strike the object plane 16 at a reflection point C at a diagonal or sloping angle. The beam 30 is reflected or sent back or remitted as a reflected measuring beam 32 and is then deflected via the objective 10 once again through the beam splitter 20 at a point B on the other side of the beam path (in relation to the point A). The deflected beam 32 then illuminates the detector 28, e.g. a position-sensitive detector (PSD), the output signal of which is dependent on the location where the beam 32 strikes or makes contact, so that the location is determined in this way.

In the event of defocusing, i.e. in the present instance according to FIG. 1 where the object plane 16 is shifted into the plane 16' (or a point that is to be imaged is displaced from the plane 16 into the plane 16'), the measuring beam 30 is first reflected at the reflection point D which has been displaced relative to the point C not only in the direction of the optical axis 8 but also laterally or sideways thereto. As shown, the corresponding reflected beam 32' reaches the detector 28 at a different place and thus delivers a modified signal relative to the focus position. In this way the degree of defocusing can be measured and compensated by the said motor 27 which moves the objective lens.

The following patent specifications deal with systems based on this triangulation principle as described above.

DE 32 19 503 A1 discloses an autofocusing device for optical equipment, particularly reflected-light microscopes. In this apparatus a laser autofocusing arrangement is provided which generates a measuring beam pencil one half of which is screened off by an optical component. The measuring beam pencil which is reduced to half its cross section is coupled into the illuminating beam path of the reflected-light microscope as an autofocus measuring beam and this in turn falls onto an object via the objective pupil and the objective. In this way the measuring beam which is half screened off—preferably pulsed laser light in the IR range—generates a measuring spot on the object for the autofocus which does not interfere with the microscopic observation. During defocusing this measuring sport "migrates" on the surface of the object.

The optical component which covers half the measuring beam pencil may be for example a deflecting prism, in this case, which is half introduced into the measuring beam path up to the optical axis. The side of the deflecting prism pointing towards the laser light source is fully reflective, so that a half screened off measuring beam extends in the direction of the optical axis as far as the objective pupil and is focused on the object through the objective as a measuring spot. After being reflected from the surface of the object the (half) autofocusing measuring beam sent back also extends in the direction of the optical axis back to the said deflecting prism, while during its "return journey" the remitted autofocus measuring beam runs in the pupil half which is opposite to the outward journey, in which the screened off part of the measuring light beam pencil directed towards the object is located. The reflected autofocus measuring beam is conveyed through the deflecting prism to a detector which may consist essentially of a differential diode (two diodes). When the system is optimally focused, the image of the measuring spot is located in a precisely symmetrical position relative to the two diodes of the detector. In the event of defocusing the image of the measuring spot migrates away from the central position in the direction of one of the two diodes, depending on the direction of defocusing. As a first approximation, the amount of displacement of the measuring spot on the differential diode is proportional to the amount of defocusing. The apparatus makes it possible to reverse the detected defocusing by corresponding counter-steering of the objective and/or the stage in the z-direction. With the apparatus proposed therein it is also possible to set defined amounts of defocusing ("offset") so as to be able to carry out microscopic observations at different heights, for example in the case of objects structured in the z-direction.

An autofocus system with a similar measuring principle is also known from US 2004/0113043 A1. Once again, a half-screened off measuring beam is directed onto an object that is to be examined under the microscope in order to produce a measuring slot. The reflected measuring beam is supplied to a CCD sensor. A signal processing device provided downstream delivers signals for the defocusing to a computing unit (CPU) which in turn controls the stage and/or the objective so as to correct any defocusing. The said measuring slot is generated by means of infrared light, while the image of the measuring slot is reflected at interfaces of the object (surface of the cover glass, surface of the sample underneath the cover glass). The reflected measuring slot is imaged on a line detector (CCD sensor) through optical means which lastly comprise a cylinder lens. The correlation between the corresponding detection signal and the actual focus position is illustrated in the said US patent specification.

A similar autofocusing system for an inverted microscope with transmitted-light illumination is known from U.S. Pat. No. 7,345,814 B2. To minimise the scattered light, a polarisation beam splitter and a $\lambda/4$ plate are provided in the beam path of the autofocusing device. In the particular application described therein, the autofocusing device ensures focusing on the cover glass in order subsequently to shift the objective of the microscope by a predetermined amount in the z-direction ("offset").

For completeness it should be pointed out that an autofocusing device for microscopes is already known from the older German patent specification 21 02 922. A similar device for automatic focusing of a microscope on different object planes is known from Austrian patent AT-353 497.

A feature common to the autofocusing processes described above is that they operate with a fixed half-shutter, particularly a central iris diaphragm, which is switched off on one side from the optical axis to the edge of the beam cross section. As a result the object is illuminated on one side with the autofocus measuring beam (triangulation principle). The result of this geometry, during defocusing, is that the image of the autofocus mark is shifted on the sensor, while the defocusing is proportional to the decentring of the centroid of the image, in a first approximation. The size of the detector delimits the maximum capture range for focus settings in the z-direction in the region of the object. These systems are therefore unsuitable, in particular, for seeking the focus position in the event of a large defocus.

Another disadvantage of the known systems are the so-called first order reflections, which are formed most noticeably at the apices of the optical surfaces (lenses) and have a highly disruptive effect on the measuring signal. The signal-to-noise ratio which is impaired by first order reflections becomes particularly noticeable when an interface between the cover glass and the aqueous solution is used as a reference surface for holding the focus, as the reflection of this interface is only about 4 per thousand (4‰). As a result the autofocus reflection can be covered by the scattered light. To minimise scattered light, therefore, polarisation beam splitters with $\lambda/4$ plates are used in the above-mentioned U.S. Pat. No. 7,345, 814 B2.

It is therefore desirable to provide an improved triangulating autofocus system for microscopy which avoids the above-mentioned disadvantages of the known prior art as far as possible, and in particular a system according to the invention should have a large capture range, should restrict the influence of disruptive scattered light and/or should be suitable for autofocusing on samples that reflect very poorly.

SUMMARY OF THE INVENTION

To solve this problem the invention proposes an autofocus aperture stop in a triangulating autofocusing device for a microscope as well as an autofocusing device of this kind according to the independent claims. Corresponding embodiments can be found in the respective sub-claims and in the description that follows. Moreover, the corresponding use of at least two autofocus aperture stops according to the invention is claimed.

An autofocus aperture stop in a triangulating autofocusing device for a microscope, wherein the aperture stop comprises at least one diaphragm or aperture, with which a measuring beam pencil extending in the direction of the optical axis of the autofocusing device can be limited in its cross section, when the autofocus aperture stop is inserted in the measuring beam pencil, is configured according to the invention such that the diaphragm opening of the aperture stop is arranged in a decentred position at a spacing from the optical axis of the autofocusing device, while the diaphragm opening in one half of the cross section of the measuring beam pencil is able to produce a decentred autofocus measuring beam.

Unless stated otherwise, the definition "the diaphragm opening is arranged at a spacing from the optical axis" means that every point of the diaphragm opening is at a distance from the optical axis that is greater than zero. Moreover, the diaphragm opening is fully housed in one half of the cross section of a measuring beam pencil, so that as a result the diaphragm opening of the autofocus aperture stop limits the cross section of a measuring beam pencil extending in the direction of the optical axis of the autofocusing device such that this screened-off beam pencil, hereinafter referred to as the autofocus measuring beam, does not pass through the axially close region. The autofocus aperture stop according to the invention thus produces, with the decentred diaphragm opening, a decentred autofocus measuring beam that does not coincide with the optical axis, in one half of the original cross section of the measuring beam pencil. The autofocus measuring beam screened off by the autofocus aperture stop may comprise beams having a divergent, convergent or parallel path in its beam pencil.

The autofocus aperture stop proposed according to the invention thus not only limits the cross section of the measuring beam pencil to at most one semi-circular segment but also covers a large part of the other semi-circular segment and an area about the optical axis. In this way, axially close beams which lead to the above-mentioned first order reflections are largely prevented. The surface apices of the optical surfaces (lenses) present in the measuring beam path thus do not have the autofocus measuring beam running through them, with a result that no reflections produced there are able to strike the detector of the autofocusing device. As a result the signal-to-noise ratio of the measuring signal can be improved in favour of a highly precise measurement. This is particularly to the benefit of autofocused systems which use interfaces with a low level of reflection, such as the interface between cover glass and aqueous solution or Petri dish and aqueous solution, as a reference surface for holding the focus. The degree of reflection is only about 4/10th of 1% (=0.004), which is very much less than the degree of reflection on glass, which is about 4% (0.04). Hitherto conventional measures for reducing scattered light by means of additional optical components can be dispensed with.

It is advantageous if the diaphragm opening of the autofocus aperture stop is a segment of a circle which is bounded by two arcs of different radii. This segment may comprise the entire semi-circular segment in the circumferential direction. However, a more limited extent in the circumferential direction is more favourable. An elliptical, oval or kidney shape of the diaphragm opening of the autofocus aperture stop has proved suitable for particularly good imaging of the measuring pattern, particularly a measuring slot.

A particularly effective suppression of first order reflections can be achieved if the distance of the centroid of the diaphragm opening from the optical axis of the autofocusing device or of the measuring beam pencil corresponds to at least half the radius of the entry pupil of the microscope objective. The minimum requirement for successful prevention of reflexes is that the distance of the centroid of the diaphragm opening from the optical axis of the autofocusing device or measuring beam pencil is at least 0.5 mm to 1.0 mm, depending on the type of objective. In other words, if an area around the optical axis with a radius of at least 0.5 mm to 1.0 mm is covered by the aperture stop, a large proportion of the first order reflections can be suppressed in objectives with a smaller entry pupil. The maximum distance is limited only by the radius of the entry pupil. For a good reflection reduction of more than 50% the minimum distance from the optical axis should be 25% to 40% of the pupil radius of the entry pupil of the microscope objective (for example 25% for a 40× objective and about 40% for 63× and 100× objectives). Moreover the diaphragm opening should preferably be located as far as possible on the edge of the cross section of the measuring beam pencil. In this way the resulting autofocus measuring beam is decentred sufficiently. The criterion regarding the distance of the centroid of the diaphragm opening from the optical axis simultaneously limits the size of the diaphragm opening in relation to the cross section of the measuring beam pencil.

According to another aspect the present invention relates to a triangulating autofocusing device for a microscope having an autofocus aperture stop for limiting the cross section of a measuring beam pencil of the autofocusing device and with an autofocusing optical device, so as to produce a measuring pattern on the object using an objective of the microscope, by means of the autofocus measuring beam produced by the autofocus aperture stop. The basic design and mode of operation of generic triangulating autofocusing devices of this kind have already been described in detail in the introduction to the description. According to the invention, in an autofocusing device of this kind, at least one autofocus aperture stop according to the first aspect of the invention discussed hereinbefore can be selected in order to produce the autofocus measuring beam and inserted in the measuring beam path of the autofocusing device. An autofocusing device of this kind gives optimum signal-to-noise ratios which make it possible to use interfaces with extremely low reflection to hold the focus.

Advantageously, in a triangulating autofocusing device of this kind, at least two different autofocus aperture stops are provided, the decentred diaphragm openings of which are arranged at different spacings from the optical axis of the autofocusing device and can be alternatively selected and inserted in the measuring beam path.

It is clear from the mode of operation of a triangulating autofocusing device as described hereinbefore that a "more decentred" aperture stop, i.e. one with a diaphragm opening at a greater distance from the optical axis, leads to an autofocus measuring beam with a greater distance from the optical axis and hence with a greater angle on the object (cf. FIG. 1 described hereinbefore) than when there is a "less decentred" aperture stop, i.e. where the autofocus measuring beam extends closer to the optical axis. A larger angle in turn leads to considerable shifting of the measuring pattern on the detector in the event of defocusing in the object range. Even slight defocusing of the object (displacement in the z-direction, cf. FIG. 1) therefore leads to a measurable result. Because of this, the "more decentred" aperture stop can be used to advantage in order to achieve greater precision when readjusting the focus setting (so-called "holding focus") but not in order to search for the focus position in the event of a large defocus. In the latter case of high defocusing of the object in the z-direction, it is, in fact, probable that the measuring pattern will move out of the detector range, i.e. the maximum capture range of the detector will be exceeded.

By contrast, the use of a "lower decentring" autofocus aperture stop makes it possible to search for the focus position in the event of a large defocus as the less decentred aperture stop produces a smaller angle which in turn results in a comparatively lesser displacement of the measuring pattern on the detector as the object interface scanned by the autofocus is moved. Thus the capture range for finding a focus position with an unchanged detector size with the less decentred autofocus aperture stop, i.e. with the diaphragm opening less decentred, is much higher than with the more decentred aperture stop.

In practice, the autofocus is frequently focused on a defined interface, e.g. the air interface of a sample surface or an interface between a sample fluid and glass. This is done either manually by the user with visual monitoring of the sample or using a special focus search function of the autofocusing device in which the focus position is determined from the output signals from the detector by comparing these output signals with the signal values of a calibrating curve recorded previously. The actual microscopic examination may operate with an "offset" in which the autofocus is adjusted by the user to another, more easily scanned interface than the visual focus (cf. the introduction to the description). This presupposes that the distance between these two foci is known, for example the thickness of the cover glass of a microscopic preparation or the thickness of the base of a Petri dish holding the sample that is being examined visually.

In particular in the case of long-lasting microscopic examinations (e.g. of cell samples) a holding focus on a defined interface (for example between the (cover) glass and aqueous solution) is advantageous, where the focus selected by the user is constantly readjusted. In order to search for the interface it is advantageous to use an autofocus aperture stop with a less decentred diaphragm opening in order to achieve a larger capture range, while in the region of the interface an autofocus aperture stop with a less decentred diaphragm opening yields a smaller capture range and hence greater sensitivity.

In a particularly preferred embodiment at least two different autofocus aperture stops are associated with different entry pupil diameters of different microscope objectives and can be selected and used in the measuring beam path depending on the entry pupil diameter of the objective currently selected. It would even be conceivable to have a corresponding autofocus aperture stop available for each objective in the microscope. However, in practice it has been found that two autofocus aperture stops the diaphragm openings of which are arranged at different distances from the optical axis of the autofocusing device are sufficient to cover the normal range of entry pupil diameters of the microscope objectives. The microscopes under consideration here usually operate with objectives with a magnification in the range from 10× to 100×, but other objectives are also possible (for example 150×).

For a better understanding of the dependency of the decentring of the autofocus aperture stop opening, as preferred here, depending on the entry pupil diameter of the microscope objective used, the depth of focus of the microscopic image both on the object side and on the image side will first of all be discussed. The microscopic imaging uses objectives of a higher magnification and larger numerical aperture in order to image object structures with higher magnification in an image plane using a tube lens (intermediate image for viewing through an eyepiece). The focal length of the tube lens is many times greater than that of the objective. Whereas the depth of focus in the object range decreases as the objective magnification increases and the numerical aperture increases and is in an overall range of only about 0.5 to 10λ, (wavelength of the light used), the depth of focus for the same objectives in the image range (e.g. on the detector surface) increases as the objective magnification increases and varies overall within a very much greater range of about 1000 to 5000λ. A rough estimate of the accuracy of the focus setting is the depth of focus/3.

The entry pupil diameter of an objective is proportional to the product of the numerical aperture and the focal length of the objective. As the numerical aperture of conventional microscope objectives certainly increases as the magnification increases but the focal length reduces more sharply, on the other hand, the entry pupil diameter of the objectives falls as the magnification increases. It is therefore expedient to use more highly decentred aperture stops for low-magnification microscope objectives than for high-magnification microscope objectives. As already explained, more decentred aperture stops (large distance of the diaphragm opening from the optical axis) have a small capture range but because of the sensitivity at the detector permit high accuracy of focus setting or focus regulation (so-called "holding focus"), as is also necessary for low-magnification objectives, as explained in detail hereinbefore. High-magnification microscope objectives with their smaller entry pupil diameters, on the other hand, should expediently be used with less decentred autofocus aperture stops. Because of the low decentring of the diaphragm opening these are suitable for seeking the focus position because of the higher capture range. This in turn suits the very much greater tolerance in the focus precision of high magnification objectives as explained in detail above.

With the microscope objectives with magnifications in the region of 10× to 100× under consideration here, it has proved sufficient to provide two differently decentred autofocus aperture stops for insertion in the measuring beam path or for introduction into the measuring beam pencil. It is particularly advantageous if the distances of the respective centroids of the diaphragm openings from the optical axis of the autofocusing device or measuring beam pencil differ by at least a factor 2. It goes without saying that this requirement is in principle not restricted to just two aperture stops.

For precise autofocus measurement it is useful if the at least two autofocus aperture stops are to be arranged in the measuring beam pencil such that the centroids of their diaphragm openings are each located on the same line perpendicular to the optical axis of the autofocusing device, because the object structures are then struck by the autofocus measuring beam with both autofocus aperture stops from the same direction. Thus the slit images of the autofocus measuring beam on the detector can be evaluated in the same way. Preferably the autofocus aperture stops have the same area contents so as to receive the same signal strengths.

In practice, calibrating curves for the focus signals can be stored for the various autofocus aperture stops provided. For this purpose, for each autofocus aperture stop, the focus on the object is run through ("z-tuning" by adjusting the height of the microscope stage or the objectives) and corresponding signal curves which associate the detector signals with the respective z-position are recorded on the detector. This makes it possible for the customer to store focus positions with the respective optional aperture stop in terms of signal strength, contrast, etc.

It is also advantageous if the diaphragm openings of two autofocus aperture stops do not overlap in their projection onto the cross-section of the measuring beam pencil. In particular, when the distances of the centroids of the diaphragm openings from the optical axis differ by a factor 2, autofocus aperture stops are obtained which are decentred sufficiently differently from the optical axis.

The automatic selection of a suitable aperture stop and its use in the measuring beam path as a function of the microscope objective just used or its entry pupil diameter are advantageous. For this, the objectives used are detected by their characteristics in a motorised or automated microscope.

In practice it has proved advantageous if a more decentred autofocus aperture stop is used for "lower objective magnifications", i.e. those between 10× and 63× (intermediate values are explicitly also disclosed) than for "higher objective magnifications", particularly those above 63× to 100× or more, while once again intermediate values are explicitly also disclosed. Thus, for example when making the transition from an objective magnification of 20× to an objective magnification of 100× or for example from an objective magnification of 40× to an objective magnification of 150×, it is also advantageous to change the autofocus aperture stops and hence the decentring of the autofocus measuring beam.

It will be understood that the features mentioned above and those to be explained hereinafter may be used not only in the particular combination specified but also in other combinations or on their own, without departing from the scope of the present invention.

The invention is schematically illustrated in the drawing by means of an embodiment by way of example and is hereinafter described in more detail with reference to the drawings.

DETAILED DESCRIPTION OF THE PREFERRED EMBODIMENTS

The triangulating autofocusing device according to FIG. 1 has already been discussed in detail in the introduction to the description.

Figure 2A:
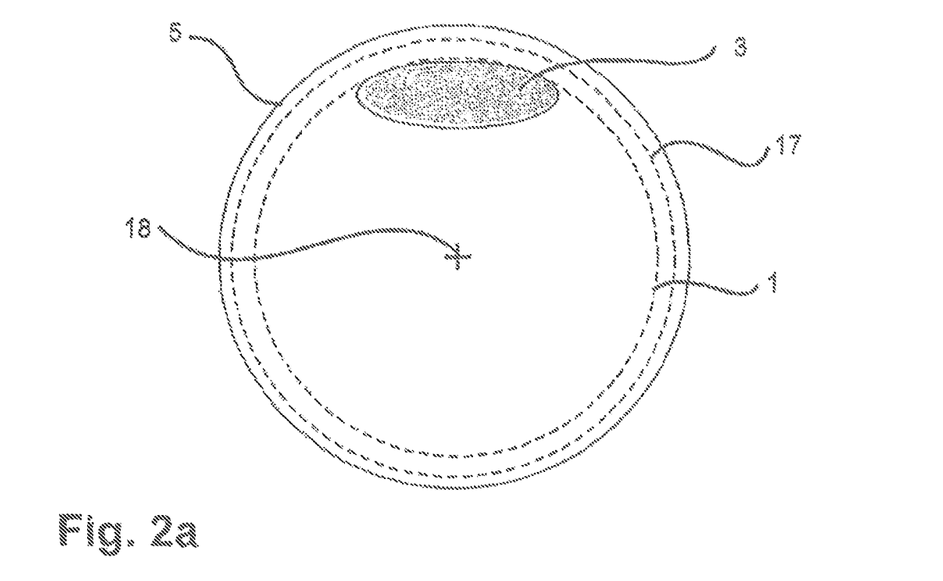
FIG. 2a shows a first example with a highly decentred autofocus aperture stop viewed schematically.
Figure 2B:
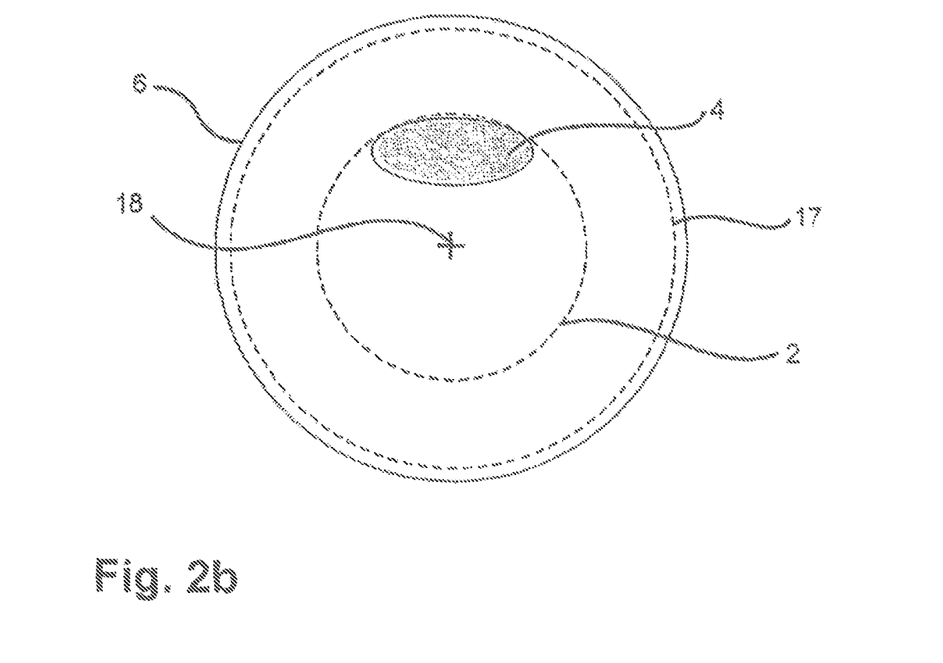
FIG. 2b shows a second example with a slightly decentred autofocus aperture stop viewed schematically.

FIGS. 2a and 2b now show two different autofocus aperture stops 5 and 6 of the kind that may advantageously be used alternatively in a triangulating autofocusing device for a microscope in order to limit the cross section of a measuring beam pencil 17 used for autofocusing and running in the direction of the optical axis of the autofocusing device. For this purpose the autofocus aperture stop 5 comprises a highly decentred diaphragm opening 3 and the autofocus aperture stop 6 comprises a slightly decentred diaphragm opening 4. Each of the two diaphragm openings 3 and 4 is decentred at a spacing from the optical axis 18 of the autofocusing device or measuring beam pencil, so that each diaphragm opening 3 or 4 is located outside the said optical axis 18. In addition, for carrying out a triangulating autofocus measurement, each diaphragm opening 3, 4 is located in one half of the cross section 17 of the measuring beam pencil. The precise outer configuration of the autofocus aperture stops 5 and 6 is not shown in FIG. 2 as they may take different forms. For example, they may be arranged on a stop or diaphragm slide that can be pushed into the beam path. Alternatively, they may be mounted on swivelling levers. By swivelling the associated lever the autofocus aperture stop can then be introduced into the measuring beam pencil. The aperture stops 5 and 6 cover the entire cross section 17 of the measuring beam pencil, apart from the region of the diaphragm opening 3 or 4, respectively, so that after passing through the aperture stop 5 or 6 a decentred autofocus measuring beam is obtained. The circular regions 1 and 2 denote the cross sections of the entry pupils of the respective microscope objectives which are preferably used together with the respective autofocus aperture stop 5 or 6.

Both embodiments of the autofocus aperture stops 5 and 6 have diaphragm openings 3 or 4, respectively, of oval configuration which are arranged at the edge of the aperture stop 5 or 6 so that the lateral extent of the diaphragm openings 3 and 4 is greater than the radial extent of the particular diaphragm opening. In this way the area of the diaphragm opening in question is increased while the decentring is retained. Because of the larger surface the signal strength at the exit from the detector is greater than with a circular diaphragm opening. This improves the signal-to-noise ratio, particularly with poorly reflective samples or interfaces in the focus. The distances of the centroids of the diaphragm openings 3 and 4 from the optical axis 18 differ by at least a factor 2. Moreover the diaphragm openings 3 and 4 do not overlap the cross section 17 of the measuring beam pencil in their projection. This ensures that two autofocus aperture stops 5 and 6 can be used, the diaphragm openings 3 and 4 of which are arranged in very differently decentred positions in the cross section of the beam. This is of major advantage for the use of the autofocus aperture stops 5 and 6 shown, in a triangulating autofocusing device, as will be described in more detail hereinafter.

Figure 3:
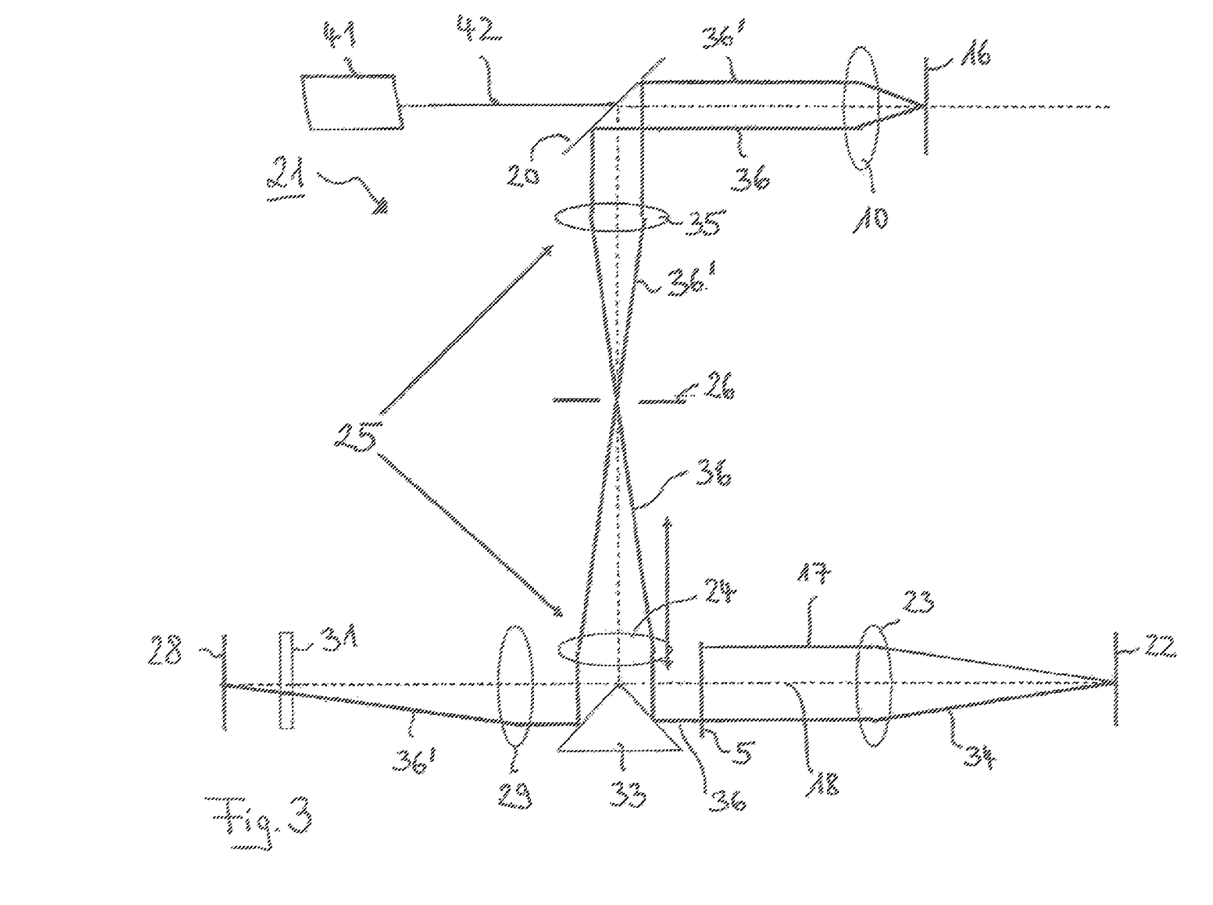
FIG. 3 schematically shows the total beam path through a triangulating autofocusing device according to the invention.

FIG. 3 shows the use of one of the two autofocus aperture stops 5 or 6 from FIG. 2—in this case autofocus aperture stop 5—in a triangulating autofocusing device which is generally designated 21. Elements identical to those in the autofocusing device according to FIG. 1 have been given the same reference numerals. Starting from an illuminating slot 22 which can be produced for example by means of an LED with a collector in front of it and a slit stop, a measuring beam pencil 34 runs along the optical axis 18 of the autofocusing device 21. Arranged with its centre on the optical axis 18 is an autofocus aperture stop 5 as shown in FIG. 2, for example. In this context it should be pointed out that the autofocus aperture stop 5 may in turn be part of a diaphragm wheel or a diaphragm slide, for example. Mechanical structures of this kind for replacing or changing diaphragms or stops are known per se and are not a subject of the present considerations.

The illuminating optical device 23 together with the focusing lens 24 images the illuminating slit 22 into the illuminated field diaphragm 26. The autofocus measuring beam 36 is guided to the objective 10 of the microscope through the so-called transporting optical device 25 which encompasses the focusing lens 24 movable along the optical axis and a further transporting lens 35. A dichroic beam splitter 20 splits the imaging beam path 42 of the microscope leading to the tube 41 from the beam path of the autofocusing device shown here. The autofocus measuring beam 36 reaches the object plane 16 and images a measuring pattern, in this case a measuring slot, on the object. When the image of the measuring slot is sharp, the autofocus measuring beam 36 is in focus.

As can be seen from FIG. 3, the autofocus aperture stop 5 with its diaphragm opening 3 produces an autofocus measuring beam 36 in one half of the cross section 17 of a measuring beam pencil 34 running along the optical axis 18, the autofocus measuring beam 36 extending in a decentred manner from the optical axis 18. As a result the autofocus measuring beam 36 no longer runs through the region of the optical axis 18 but is close to the axis. Thus, first-order reflections, for example on the transporting optical device 25 or on the objective 10, are greatly reduced and do not enter the detector 28.

The autofocus measuring beam 36' which is sent back or remitted, i.e. reflected by the object, in turn passes through the beam splitter 20 and the transporting optical device 25 to the deflecting prism 33, as schematically shown in FIG. 3. The deflecting prism 33 causes the autofocus measuring beam 36' to be reflected to a detector side of the autofocusing device 21 which is opposite the illuminating side. Together with the detector optics 29 the autofocus measuring beam 36' sent back is in turn imaged as a slot image on the detector 28, provided in this case as a two-dimensional CCD camera. Alternatively it is possible to use a linear CCD matrix. The infrared range is particularly suitable as the spectral range of the autofocus measuring beam, so that the measuring slot on the object 16 is not visible to the eye. However, autofocus measuring beams may also be used in the visible spectral range. Scattered light is filtered out using a spectral filter 31 inserted in front of the detector 28 and permeable only to wavelengths corresponding to the autofocus measuring beam. Naturally, the sensitivity of the detector 28 must also be within this spectral range.

With the arrangement shown in FIG. 3 it is possible to produce a triangulating autofocusing device 21 which keeps the focus, for example, on an interface with a very low level of reflection. Because of the suppressed first-order reflections the signal-to-noise ratio is high enough to keep the holding focus stable for long periods even at low reflection levels in the parts per thousand range.

Figure 4:
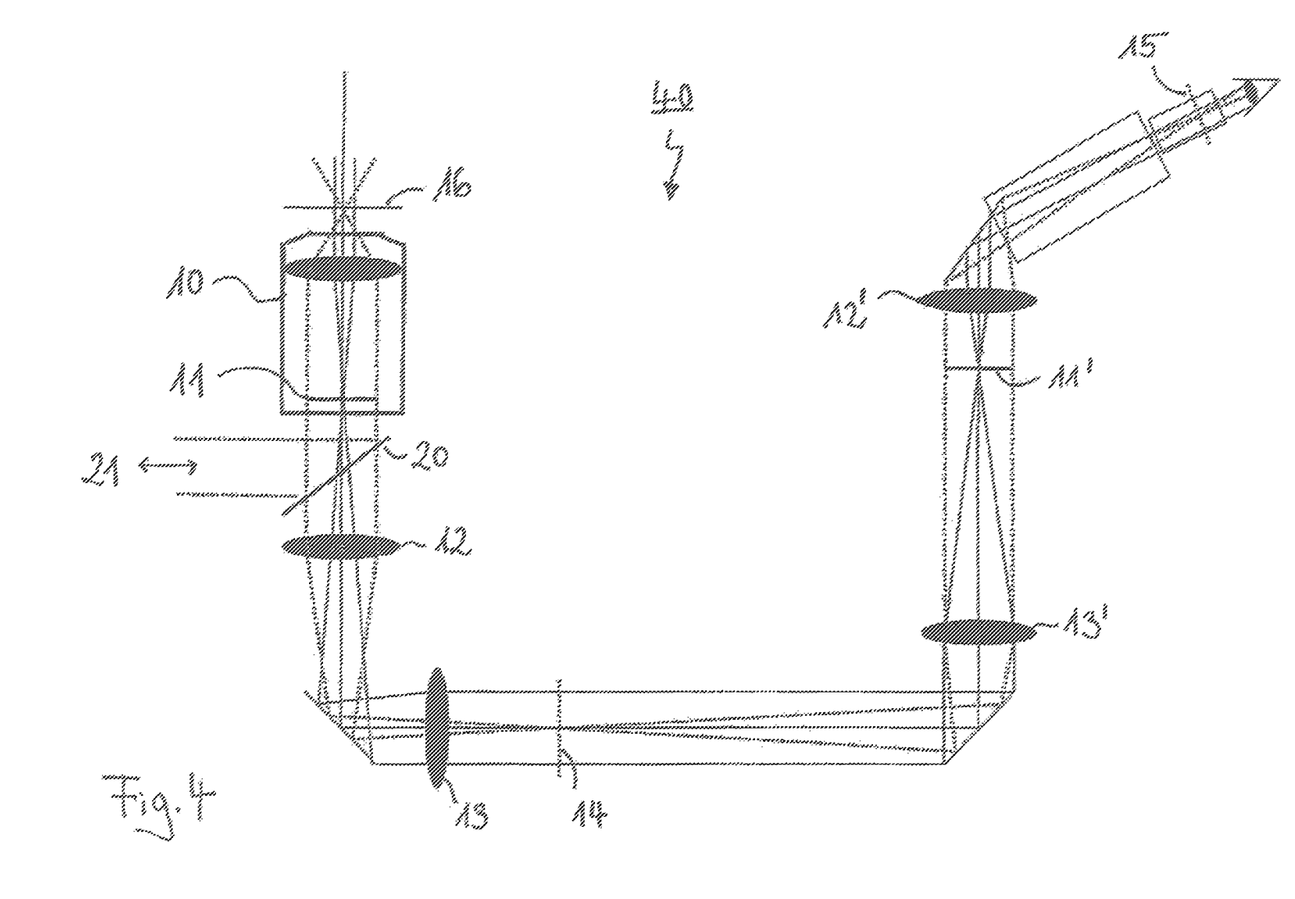
FIG. 4 schematically shows the beam path through an inverted microscope connected to an autofocusing device.

For a baseline setting of the focus on the microscope (c.f. FIG. 4 hereinafter), for example, the user focuses on an interface between a cover glass and an aqueous embedded specimen by visual monitoring. The measuring slot position on the detector 28 thus obtained is recorded as the "zero line". This is an intensity signal of the position-sensitive detector 28, e.g. a CCD chip which constitutes the image of the measuring slot as an intensity curve over one direction of the detector 28. In the event of weak signals the curve may also be added on several times in order to superelevate the signal-to-noise. The intensity curve has a peak at the location of the measuring slot, the half-maximum value of which, on its left or right hand flank, is defined as the focus signal.

As the diaphragm opening 3 of the autofocus aperture stop 5 is arranged decentred on the autofocus aperture stop relative to the optical axis 18, the measuring slot of the autofocus produces a diagonal or angular illumination of the sample. As a result the two flanks of the peak are somewhat different, as one of them is generally somewhat in shadow and it is more difficult to determine the half-maximum value. Therefore, before the start of the measurements, the user preferably selects which flank will be used to obtain the signal. Naturally, an automatic signal evaluation may also be provided which automatically determines the "better" flank from the intensity signal of the detector 28.

Once a certain threshold value of the focused signal has been exceeded, the autofocusing device makes it possible to regulate the focus position, which can be used either to find the focus with the optimum focus signal or to hold or automatically readjust the focus in the event of changes in the distance between the specimen and the objective (e.g. caused by thermal influences on the microscope or changes in the specimen, such as cell division, cell migration, etc.).

With a visually sharpened image, i.e. visual focus, the autofocus measuring slot may possibly still be out of focus. In order to obtain a sharp slot image, therefore, while maintaining visual focus, i.e. without altering the distance z between the specimen interface and the objective, the focusing lens 24 may be moved in the axial direction until the focus signal of the detector 28 exceeds the threshold value or reaches a predetermined optimum value. In such a case the visual focus (on the microscope) is equal to the measuring slot focus of the autofocusing device.

For each objective used, the technical data such as magnification, dry or wet objective and numerical aperture, is stored in the actuating device of the autofocusing device. If required, additional information may be provided regarding admissible z values, i.e. the distance of the objective relative to the specimen. This prevents the front lens of the objective from being accidentally placed on the specimen, which might damage it. Moreover, the thickness of the cover glasses used may be stored in the actuating device of the autofocusing device for the planned investigations.

In this way, in another baseline setting, the side of a cover glass remote from the object may be selected as the position of the measuring slot focus (the cover glass being roughly 170 μm thick), while the visual focus of the microscope is underneath the cover glass, i.e. on the said interface. For this purpose the visual focus and the measuring slot focus are set as already described hereinbefore. The position of the measuring slot focus is then moved onto the side of the cover glass opposite the visual focus by moving the focusing lens 24 along the optical axis by a defined amount that corresponds to the known thickness of the cover glass. This has the advantage that the measuring slot of the autofocus is focused on a glass-air interface where it achieves a stronger reflection and as a result stronger focus signals are produced with better regulating characteristics.

After a suitable baseline setting has been selected the microscopic examination is carried out during which the measuring slot focus is kept constant by means of the autofocusing device 21, thus also ensuring that the visual focus remains unchanged.

A particularly preferred embodiment is the choice of an autofocus aperture stop 5, 6 as a function of the entry pupil diameter of an objective of the microscope which is used together with the triangulating autofocusing device 21, as already explained in the general part of the description. On this point the beam path of a microscope will briefly be described with reference to a specific embodiment according to FIG. 4.

FIG. 4 shows a beam path of an inverted research microscope of the kind frequently used for examining cells. Inverted microscopes can be conveniently used for examining samples in Petri dishes. In particular, they are suitable for handling cells during microscopic examination as the upper object space is freely accessible. For further details of inverted microscopes and microscopes in general for examining processes in (living) cells, reference should be made to the general literature on the subject. FIG. 4 shows an objective 10 of an inverted microscope generally designated 40. The objective pupil (or entry pupil of the objective) is designated 11 and is located in the rear part (remote from the object) of the overall objective 10 which in practice consists of a plurality of lens components, of which only one lens component is schematically shown here by way of example. The objective 10 together with the tube lens 12, 13 generates a first intermediate image in an image plane 14. Linked to the objective pupil 11 is the intermediate pupil 11'. A second intermediate image is produced by a transporting optical device 12', 13' in the plane 15 and is viewed by eye through an eyepiece. Instead of viewing with the human eye it is naturally also possible to attach a camera or other kind of image detector. The dichroic beam splitter is also designated 20 in FIG. 4. It serves to couple in the autofocus measuring beam 36 or to couple out the autofocus measuring beam 36' reflected from the object into or out of the autofocusing device 21, as shown in FIG. 3, for example.

As can be seen from viewing FIGS. 2 and 3 together while taking account of the basics of triangulating autofocusing (cf. the remarks relating to FIG. 1), when the slightly decentred aperture stop 6 is used, with a predetermined objective 10 and a predetermined size of detector 28, defocusing of the object plane 16 leads to very much smaller shifts on the detector 28 than when the highly decentred aperture stop 5 is used. Thus the capture range, i.e. the maximum defocusing that can be recorded by the detector 28, is many times higher for the less decentred aperture stop 6 than for the more decentred aperture stop 5.

Under the conditions specified hereinafter, the following typical capture ranges are obtained for the following objectives selected by way of example:

for 20×, dry: from −50 μm under the interface to about 200 μm above, i.e. focused into the sample;

for 40×, dry: from −20 μm under the interface to about 80 μm above, i.e. focused into the sample;

for 40×, oil: from −20 μm under the interface to about 80 nm above, i.e. focused into the sample;

for 100×, oil: from −20 μm under the interface to about 30 μm above, i.e. focused into the sample.

For different degrees of decentring of the autofocus measuring beam in the objective pupil, the levels of sensitivity that can be achieved for a 40×/0.85 objective will now be considered. The objective has the numerical aperture NumAp=0.85. In a system with infinity objectives (objective focal length 5 mm; Leica=reference focal length 200 mm), and a detector focal length of 100 mm and a CCD chip width of 3 mm and a mean autofocus wavelength of Lambda=546 nm, degrees of decentring of the autofocus measuring beam by 2 mm and 4 mm in the objective pupil, by way of example, result in the following equations for the depth of focus DF:

$$DF = \text{Lambda}/(\text{NumAp})^2 = 546 \text{ nm}/0.85^2 = 0.75 \text{ μm}.$$

Defocusing of the object in the z-direction by precisely one depth of focus DF, with a 2 mm decentring of the autofocus measuring beam in the objective pupil, results in a lateral shift of 13 μm on the detector Defocusing of the object in the z-direction by precisely one depth of focus DF, how-ever, results in a lateral shift of 40 μm at 4 mm decentring of the autofocus measuring beam in the objective pupil on the detector.

When using a dry 40× objective and the autofocus aperture stop 5 with a decentring of the diaphragm opening 3 from the optical axis 18 of 4 mm, a capture range of ±28 μm is obtained in the object space. Using the same dry 40× objective with an autofocus aperture stop 6 with lesser decentring of the autofocus measuring beam of the diaphragm opening 4 from the optical axis of only 2 mm, significantly larger capture ranges of ±88 μm can be achieved. Thus the large capture range for the dry 40× objective as described above can be obtained by associating the correct autofocus aperture stop with a suitably decentred diaphragm opening and at the same time a very high sensitivity can be achieved in the important area about the interface used for the autofocus, i.e. achieving a very high focus stability by adjustment.

Figure 5:
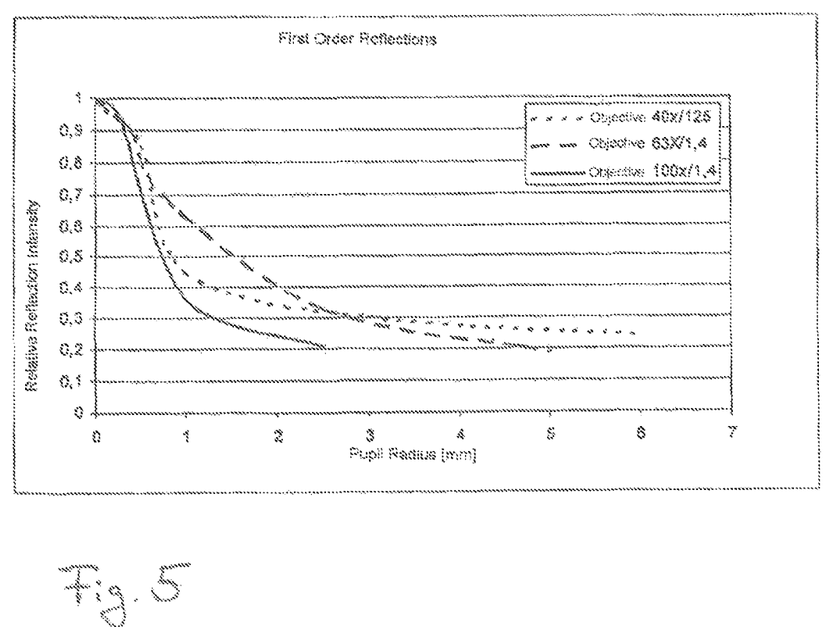
FIG. 5 finally shows the paths of the relative intensities of first-order reflections for different objectives plotted against the pupil radius.

FIG. 5 shows the relative reflection intensity for first-order reflections for three objectives selected by way of example from the applicant's own range. The relative reflection intensity is plotted against the pupil radius in millimeters. The relative reflection intensity is dimensionless and is standardised to 1 (=100%) at the point of the lens apex. The Figure shows three curves for objectives with magnifications of 40×, 63× and 100×. For the 100× objective the steepest drop in relative reflection intensity is obtained, whereas less sharp drops in intensity are obtained for the other two objectives.

The curves represented also show the entry pupils which are obtained from the end points of the curves. Thus, the radius of the entry pupil of the 100× objectives used here is somewhat above 2.5 mm, so that an entry pupil diameter somewhat above 5 mm is obtained. The 63× objective shown here accordingly has an entry pupil diameter of about 10 mm, the 40× objective shown here has an entry pupil diameter of about 12 mm.

From the curves shown in FIG. 5 for the objectives used by way of example therein, a selection can be made as to the distance at which the centroid of the diaphragm opening of the autofocus aperture stop should be located from the optical axis of the measuring beam pencil: for example, for the 100× objective shown, with a value of about 1 mm for the pupil radius, a drop in the relative reflection intensity to 0.4 is obtained, i.e. 40%. Thus it makes sense here to set the distance of the diaphragm opening centroid from the optical axis at about 1 mm in order to reduce the reflection intensity by 60%.

If the intention was to use only the regions of the pupil with a relative reflection brightness of less than 0.4 for the autofocus, for the 40× objective a central region of about 25% of the pupil radius would have to be abandoned, whilst with the 63× objective shown a central region of about 40% would be lost and for the 100× objective about 30%-40% of the pupil radius would be lost. If, by contrast, the centroid of the autofocus illumination is located at about 2 mm pupil radius, reductions in reflection by a factor of 2.5 to 4, compared with the central region of the pupil, are obtained for the different objectives.

LIST OF REFERENCE NUMERALS 1, 2 Cross section of entry pupil
3, 4 Diaphragm opening
5, 6 Aperture stop
8 Optical axis
10 Objective
11 Objective pupil, entry pupil
11' Intermediate pupil
12, 13 Tube lens
12', 13' Transporting optical device
14, 15 Image plane
16, 16' Object plane
17 Cross section of measuring beam pencil
18 Optical axis
19 Autofocus light source
20 Beam splitter, dichroite
21 Autofocusing device
22 Illuminating slot
23 Illuminating optical device
24 Focussing lens
25 Transport optical device
26 Illuminated field diaphragm
27 Motor
28 Autofocus detector
29 Detector optics
30 Measuring beam
31 Spectral filter
32, 32' Measuring beam remitted
33 Deflecting prism
34 Measuring beam pencil
35 Transporting lens
36 Autofocus measuring beam
36' Reflected autofocus measuring beam
40 Inverted microscope
41 Tube
42 Microscope imaging beam path
A Deflection point
B, B' Deflection point
C Reflection point
D Reflection point
α Angle

What is claimed is:

1. A triangulating autofocusing device for a microscope comprising:
    at least one autofocus aperture stop which comprises at least one diaphragm opening arranged at a distance from the optical axis of the autofocusing device for limiting across section of a measuring beam pencil running in a direction of an optical axis of the autofocusing device and for generating a single decentered autofocus measuring beam in one half of the entire cross section of the measuring beam pencil;
    wherein the triangulating autofocusing device generates a measuring pattern on an object by means of the single decentered autofocus measuring beam using an objective of the microscope,
    and
    wherein the at least one autofocus aperture stop is selected from at least two different autofocus aperture stops, the diaphragm openings of which are arranged at different distances from the optical axis of the autofocusing device.

2. The autofocusing device according to claim 1, wherein the at least two different autofocus aperture stops are associated with different diameters of entry pupils of different microscope objectives and can each be selected as a function of an entry pupil diameter of the selected objective to produce the single decentered autofocus measuring beam.

3. Use of the autofocusing device for a microscope according to claim 2, wherein the microscope has exchangeable and/or switchable objectives.

4. The use of the autofocusing device for a microscope according to claim 3, wherein a low magnification microscope objective is used together with a diaphragm opening, that is arranged at a greater distance from the optical axis of the autofocusing device, than a diaphragm opening used with a high magnification microscope objective.

5. The use of the autofocusing device for a microscope according to claim 4, wherein the microscope comprises objectives with magnifications in the range of 10× to 100×, and wherein the beam path includes two autofocus aperture stops, the diaphragm openings of which are arranged at different distances from the optical axis of the autofocusing device, and wherein the two autofocus aperture stops are used alternatively.

6. The autofocusing device according to claim 1, comprising at least two autofocus aperture stops with distances of centroids of diaphragm openings from the optical axis of the autofocusing device differing by at least a factor 2.

7. The autofocusing device according to claim 6, wherein the at least two autofocus aperture stops are arranged such that the centroids of their diaphragm openings are located on the same straight line perpendicular to the optical axis of the autofocusing device.

8. The autofocusing device according to claim 6, wherein the diaphragm openings of the at least two autofocus aperture stops do not overlap in their projection onto a cross section of the measuring beam pencil.

9. The autofocusing device according to claim 1, comprising precisely two autofocus aperture stops.

10. The autofocusing device according to claim 1, wherein the selection of an autofocus aperture stop is carried out depending on the objective used in the microscope.

11. Use of the triangulating autofocusing device for a microscope according to claim 1, wherein the microscope has exchangeable and/or switchable objectives.

12. The autofocusing device according to claim 1, wherein the at least one diaphragm opening is bound by two arcs with different radii.

13. The autofocusing device according to claim 1, wherein the at least one diaphragm opening is elliptical, oval or kidney-shaped.

14. The autofocusing device according to claim 1, wherein a centroid of the at least one diaphragm opening is arranged at a distance from the optical axis of the autofocusing device that is at least equal to half a radius of an entry pupil determined by the microscope objective, more particularly at least equal to half a radius of the cross section of the measuring beam pencil.

15. The autofocusing device according to claim 1, wherein the distance of the centroid of the at least one diaphragm opening from the optical axis of the autofocusing device is at least 0.5 mm to 1.0 mm.

16. The autofocusing device according to claim 1, wherein the distance of the centroid of the diaphragm opening from the optical axis of the autofocusing device is in a range of from 25% to 40% of the radius of the entry pupil of the microscope objective.

17. Use of the autofocusing device for a microscope according to claim 1, wherein a smaller distance of the diaphragm opening from the optical axis is selected for identifying a focus position in the event of a large defocus, and wherein a greater distance of the diaphragm opening from the optical axis is selected to readjust the focus setting.

* * * * *